June 2, 1931.  F. H. OWENS  1,808,252

FILM GATE

Filed July 13, 1927

INVENTOR.
FREEMAN H. OWENS.
BY John O. Brady
ATTORNEY

Patented June 2, 1931

1,808,252

UNITED STATES PATENT OFFICE

FREEMAN H. OWENS, OF NEW YORK, N. Y.

FILM GATE

Application filed July 13, 1927. Serial No. 205,447.

In the art of recording and reproducing sound photographically, a strip of film is moved continuously and at a constant speed past a slit through which rays of light pass. If the sound record is being recorded, the light rays passing through the slit are photographed on the film. If a sound record already made on a strip of film is being reproduced, the light rays pass through such slit and through the sound record on the film to a photo electric cell. In either case, it is essential that the strip of film be always in actual contact with the slit, usually an optical slit consisting of a prism or piece of glass, through which the light passes. If the film is allowed to move away from the slit, the sound record will be distorted.

The principal object of my invention is to provide a novel form of film gate for apparatus of this character, which resiliently engages and holds the strip of film into engagement with the slit member as the same passes it.

Another object is to provide a simple form of gate member which may be adjusted out of contact with the film to permit threading the same past the slit member.

Still another object is to provide such a gate which is removable as a unit from the apparatus for cleaning, etc.

Still another object lies in the provision of means for locking the gate in either of its two adjusted positions with respect to the film.

Other objects and advantages in details of construction and operation will be apparent as the description proceeds, reference being had to the figures of the drawings, wherein like reference numerals indicate like parts.

In the drawings:—

By way of illustration, I have shown my improved gate in connection with an apparatus for reproducing photographic sound records. It will be understood that this gate is not limited to this use alone, but is equally well adaptable to any apparatus wherein it is desired to hold a strip of moving picture in contact with the film guide over which it moves.

Figure 1:
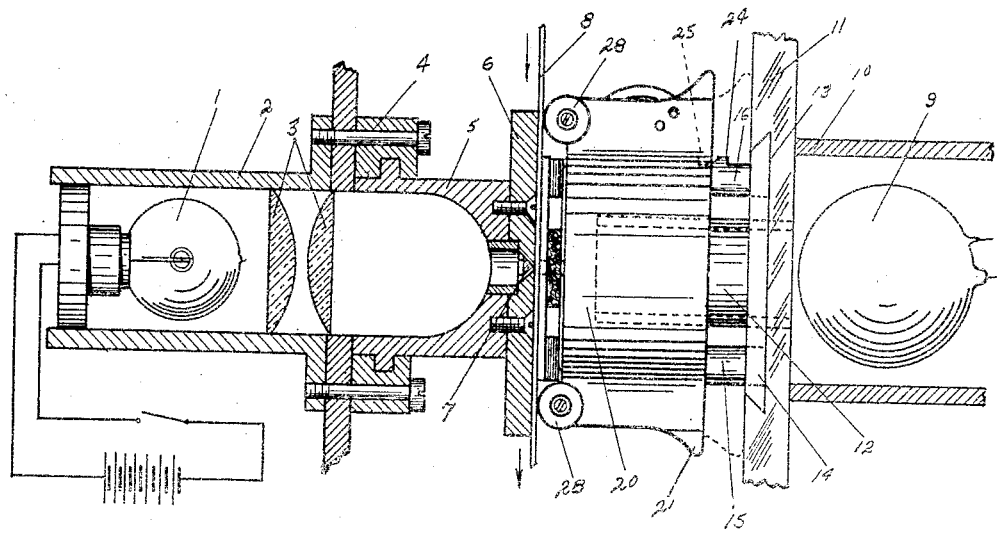
Figure 1 is a side view of my improved film gate shown in operative position.

In Figure 1 there is shown a conventional sound reproducing lamp 1 of constant intensity suitably housed in a tube 2, also enclosing condensor lenses 3 through which the rays from the lamp 1 pass. Removably mounted on the support 4 is the slit holder 5 including the plate 6 within which the slit member 7, in this instance a prism, is mounted. This slit member 7 is of course in direct alignment with the lenses 3 and the lamp 1.

A strip of photographic film 8 is moved in any suitable manner over the surface of the plate 6 and in engagement with the slit member 7 carried thereby, the sound record (not shown) on the film 8 being in alignment with the slit member 7.

On the opposite side of the film 8 and also in alignment with the slit member 7 is a photo electric cell 9 for receiving the modulated light rays from the lamp 1 after passing through the sound record on the film 8. The photo electric cell 9 is suitably housed as at 10 and the front wall 11 of such housing is provided with a forwardly extending lens mount 12 through which the light from the slit member passes to the photo electric cell 9.

The front wall 11 is provided with a dove tail groove 13 adapted to receive the similarly shaped base member 14 of my improved film gate. This base 14 is provided with a U shaped notch 15a which receives the lens mount 12 and prevents interference therewith when the base is slid into position in the wall 11.

The base 14 is provided with forwardly extending hollow bosses 15 and 16 adapted to slidably receive the pins 17 rigid with and extending rearwardly from lugs 18 on the front edge of the gate member 19. This gate member 19 comprises a semicircular shell 20 open on one side to receive the lens mount 12 and provided at its top and bottom with flanges 21 acting as finger holds.

Pivoted adjacent the upper finger hold 21, as at 22, is a locking pawl 23, the lower end 24a of which is adapted to engage with either of the shoulders 24 or 25, cut in the top of the sleeve 16. The opposite end 26 of this pawl extends above the plane of the flanged finger piece 21 in position to be readily engaged by the operator for rocking the pawl on its pivot to disengage the end 24a from the sleeve 16. A spring 27 normally forces the end 26 of the pawl upwardly and the end 24a into engagement with the sleeve 16. From this construction, it will be clear that the operator may depress the end 26 of the pawl 23 and slide the gate 19 away from the film 8 and upon releasing the end 26 of the locking pawl, the gate will be locked in such position for the threading operation. Likewise upon again depressing the end piece 26, the gate may be slid forwardly to the position shown in Figures 1 and 3, the pins 17 guiding such movement by their sliding engagement with the sleeves 16 and 15, and the gate again locked in said position by means of the dog 24a engaging the shoulder 25.

The front edges of the gate 19 are provided at top and bottom with suitably supported rollers 28 adapted to engage the film 8 and insure it being fed to and from the slit member 7 in a flattened condition. Likewise formed on the front edge of the gate 19 at top and bottom, are projecting lugs 29 adapted to receive the threaded screws 30 passing through indentations 31 at the top and bottom of a presser pad 32 which is loosely mounted on such screws or pins 30. Mounted between the presser pad 32 and the edges of the gate 19 are leaf springs 33 normally forcing said presser pad outwardly so that the bottom walls of the indentations 31 engage with the underside of the heads of the screws 30. The screws 30 pass through the leaf spring 33 and thus prevent displacement or accidental removal.

Lying between the leaf spring 33 and the front edge of the gate 19 is a plate 34 serving as a light lock to prevent the passage of light between the edges of the presser pad 32 and the film gate 19. Likewise, a light trap 35 in the form of a piece of felt or other suitable material is placed between the presser pad 32 and the plate 34. The presser pad 32 is provided with a slot 36 and the felt washer and the plate 34 are also provided with slots 37 and 38 respectively all in alignment with each other and in alignment with the slit member 7.

Figures 2, 3:
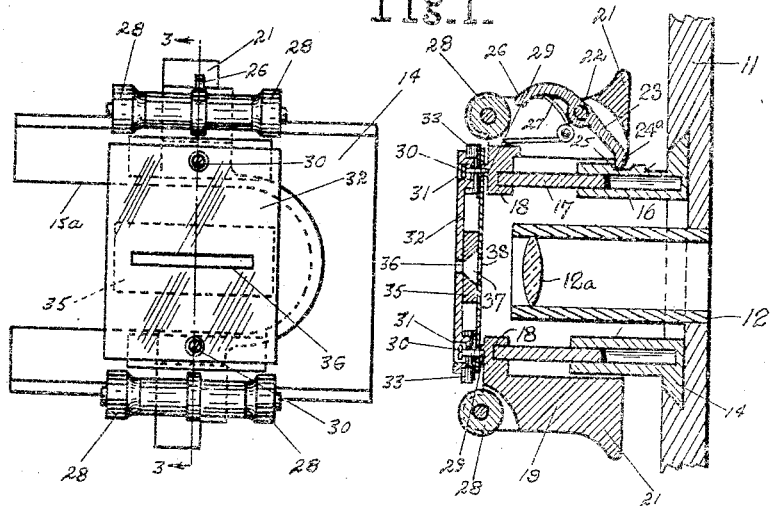
Figure 2 is a front view thereof.
Figure 3 is a cross sectional view of the gate taken on the line 3—3 of Figure 2.

It will be understood that when the gate member is pulled to the forward position as shown in Figures 1 and 3, the presser pad 32 will engage against the film 8 and resiliently hold it into engagement with the slit member 7 as the film moves past the same. When it is desired to remove the film 8 from the apparatus or rethread a strip through the same, the gate member is slid rearwardly to the position shown in dotted lines in Figure 1 and locked in such position, whereupon such threading operation may be made without interference from the gate member.

Of course many changes may be made in details of construction and operation without departing from the spirit and scope of my invention. I do not limit myself therefore to the exact structure herein shown and described other than by the appended claims.

I claim:—

1. A film gate comprising a slidable base having hollow sleeves projecting therefrom, a shell having pins slidable in said sleeves for supporting said shell on said base, a pivoted pawl on said shell engageable with shoulders on one of said sleeves whereby said shell may be locked in adjusted position, and a spring pressed pad on said shell.

2. A film gate comprising a slidable base having hollow sleeves projecting therefrom, a shell having pins slidable in said sleeves for supporting said shell on said base, flanged finger holds on said shell for adjusting the same, a pivoted pawl on said shell engageable with shoulders on one of said sleeves whereby said shell may be locked in adjusted position, and a spring pressed pad on said shell, said pad having an aperture therein.

3. A film gate comprising a slidable base having hollow sleeves thereon, a shell having pins slidable in said sleeves whereby said shell is adjustable on said base, flanged finger holds on said shell for adjusting the same, a pivoted pawl on one of said flanges engageable with shoulders on one of said sleeves whereby said shell may be locked in adjusted position, and a spring pressed pad on said shell, said pad having an aperture therein, and a light lock between said pad and said shell.

4. A film gate comprising a slidable base having hollow sleeves thereon, a shell having pins slidable in said sleeves whereby said shell is adjustable on said base, flanged finger holds on said shell for adjusting the same, a pivoted pawl on one of said flanges engageable with shoulders on one of said sleeves whereby said shell may be locked in adjusted position, and a spring pressed pad on said shell, said pad having an aperture therein, and a light lock between said pad and said shell, and an opening in said light lock in alignment with said pad aperture.

5. In combination, a slit member, a film movable past the same, a support, a film gate having a base slidable laterally in said support and readily removable therefrom, a shell slidable on said base and having a spring pressed pad thereon, and means for moving said pad into or out of engagement with said film opposite said slit member.

6. In combination, a slit member, a film movable past the same, a support, a film gate having a base slidable laterally in said support and readily removable therefrom, a shell slidable on said base and having a spring pressed pad thereon, and means for moving said pad into or out of engagement with said film opposite said slit member, and means for locking said shell in adjusted position.

7. In combination, a slit member, a film movable past the same, a support, a film gate having a base slidable laterally in said support, a lens mount projecting from said support, said base engaging around said mount, a shell slidable on said base and having a spring pressed pad thereon, means for moving said shell toward or away from said film, an aperture in said pad in alignment with said lens mount and said slit member, and means for locking said shell in adjusted position.

8. In combination, a slit member, a film movable past the slit, a support, a lens mount carried by said support and aligned with said slit, a film gate having a base slidable laterally in said support, a shell slidable on said base and having a spring pressed pad thereon, means for moving said shell toward or away from said film and means including a spring pressed locking device for holding said shell away from said film.

FREEMAN H. OWENS.